3,472,647
METHOD OF INCREASING THE AMOUNT OF FRUIT

George T. Miller, Lewiston, N.Y., assignor to Hooker Chemical Corporation, Niagara Falls, N.Y., a corporation of New York
No Drawing. Filed Dec. 1, 1966, Ser. No. 603,700
Int. Cl. C05g *1/00;* C05f *11/00*
U.S. Cl. 71—122                                          14 Claims

---

ABSTRACT OF THE DISCLOSURE

A method of stimulating the growth of plants, which comprises applying to the plant environment a growth stimulating amount of ethyl alcohol.

---

The present invention is concerned with a method and composition for stimulating plant growth, and more specifically is directed to improving the plant environment by treating this environment with ethyl alcohol, or a solution thereof.

The treatment of plants and seedlings with alcohols is known; however, the prior art is silent with respect to the utilization of ethyl alcohol for the treatment of plant environments, in order to stimulate plant growth. In contrast, several prior art references teach the utilization of alcohols and other closely related compounds for inhibiting plant growth. Even when alcohols were used to treat seedlings in the prior art, some of the results were inconsistent and varied, thus no conclusions could be derived from them.

In accordance with the present invention there is provided a method for the stimulation of plant growth, which comprises treating the plant environment in which the plant is growing, or is to be grown, with an effective or growth stimulating amount of ethyl alcohol. It has unexpectedly been found that the use of ethyl alcohol in treating soil or other environments, such as soilless culture, surprisingly and desirably increases the growth of plants. Additionally, the use of ethyl alcohol in accordance with the present invention provides for increased fruit production, and more rapid plant maturity. In another aspect of the present invention there is provided a composition containing ethyl alcohol, which composition is useful for stimulating plant growth.

With respect to soil environments generally, the soil is treated with a growth stimulating amount of ethyl alcohol prior to planting of the plant, pre-treatment after emergence of the plant, post-treatment, or the soil can be treated concurrently with the planting. In pretreatment the ethyl alcohol is applied to the soil from about one to four weeks and preferably two weeks before planting is accomplished, while in post treatment the ethyl alcohol is applied to the soil after the plant has been growing for about one to four weeks, and preferably two weeks. This treatment is also effective in other plant environments, such as hydroponic systems, that is an environment which contains no soil. Thus the beneficial effects of the ethyl alcohol or its various solutions can be supplied to the plant by adding the appropriate amount of the alcohol or its solutions to the desired environments at selected periods of time during the development of the plant or prior to its actual planting.

Normally, the amount of ethyl alcohol to be used will vary over wide ranges as it depends upon the types of plants being subjected to the treatment, the time of treatment and other conditions. However, in soil environments from about 50 pounds to about 600 pounds per acre of ethyl alcohol and preferably from about 100 to about 300 pounds per acre of ethyl alcohol have been found to be particularly effective. It is appreciated that greater and lesser amounts of ethyl alcohol may be used without departing from the scope of the invention, thus up to 4,800 pounds per acre and less than 50 pounds per acre may be effective with certain plants.

In hydroponic systems from about 0.01 weight percent to about 5 weight percent of ethyl alcohol, and preferably from about 0.1 weight percent to about 1 weight percent of ethyl alcohol is used.

Additionally, treatment of the plant environment after multiple planting results in increased growth to the plant that remains. With respect to a second planting from about 0.2 weight percent to about 10 weight percent of ethyl alcohol is used in hydroponic systems, while from about 100 pounds per acre to about 800 pounds per acre of ethyl alcohol are used in soil environments. Regarding third and subsequent plantings, greater than about 0.5 weight percent and less than about 20 weight percent of ethyl alcohol are used in hydroponic systems, while in soil environment about 150 pounds per acre to about 4,800 pounds per acre of ethyl alcohol are used.

Plant environments treated in accordance with the present invention produce plants having a better over-all growth due to larger root systems, that is, more roots, which are not only thicker but longer in comparison to the roots of plants which have not acquired the beneficial effects of the ethyl alcohol. Also an increase in the number blossoms, and an increase in the amount of fruit produced results, in comparison to untreated plants thereby allowing for a more economic production of fruit. Illustrative examples of plants, the environment of which is treated in accordance with the present invention include among others, tomato, cucumber, legumes such as beans, beet, radish, sugar beet, soy bean, connifers such as pine, spruce, hemlock and the like.

The ethyl alcohol can be applied to the soil in any of a variety of ways, such as by applying the compound in the pure form, or in a water solution together with a solid carrier, such as clay, limestone, carbon and the like, as an optional ingredient. Formulation adjuvants as is customary in the pesticide art may also be employed, such as surfactants, dispersants, sticking agents, sequestering agents, and the like. The ethyl alcohol, or its solution can be applied to the surface of the soil by spraying, thereby allowing it to penetrate the soil, or it can be mixed with irrigation water that is being used for watering the plants. Furthermore, the ethyl alcohol or its solution can be applied on the surface of the soil and washed into the soil with water.

Normally, the ethyl alcohol is used as a solution with water, preferably distilled water, although water commonly used to water plants can also be used. Various grades of ethyl alcohol can be used, such as pure ethyl alcohol, denatured types of ethyl alcohol such as ethyl alcohol containing varying amounts of benzene, pyridine, and various other known denaturing agents. The preferred alcohols are pure ethyl alcohol, 99.5 percent pure, about 190 proof, and ethyl alcohol known as 2B ethyl alcohol which contains about one-half gallon of benzene per 100 gallons of 190 proof ethyl alcohol. It is, of course, appreciated that other forms of ethanol, or its solutions, can be used without departing from the scope of the invention.

In those instances where a fertilizer solution was used together with the ethyl alcohol or its solutions, the fertilizer solutions used are those that are commonly made from totally soluble plant foods such as Nutro,® Rapid Gro,® and other commercially available plant foods. Generally these fertilizers are high analysis fertilizers, being comprised of 23 percent nitrogen, 17 percent phosphorus and 18 percent potash, the remainder of the fertilizer being comprised of minor amounts of minerals and a substantial amount of filler materials. It is appreciated that other fertilizer solutions can be used without departing from the scope of the present invention.

The following examples illustrate certain preferred embodiments of the present invention. Unless otherwise indicated, all parts and percentages used herein are by weight and all temperatures are in degrees centigrade.

EXAMPLE 1

Soil, as obtained from Grand Island, N.Y., close to the Hooker Research Laboratories, was sterilized by heating it in an oven at about 120 degrees centigrade for a period of about 16 hours. Portions of the sterilized soil were placed in containers, the bottom of the containers containing small mats of glass wool in order that the soil would be retained on them. In each of three of these containers were placed 1,500 grams of the sterilized soil. To the soil in two of the containers, 1–2, there were added the amounts of 2B ethyl alcohol as illustrated in Table I, and 150 milliliters of distilled water. To container 3, which was a control, 150 milliliters of distilled water only was added. The soil was permitted to stand for a period greater than one hour, then the soil in all three containers was mixed by emptying the contents of the containers on paper, admixing the contents with a spatula and returning the admixed contents to the respective containers.

Young tomato plants three inches tall were then added to containers 1–3 in the greenhouse. The containers were observed about one month later and rated, the results being listed in Table I. The rating scale used throughout spans from 0 to 10. A zero rating signifies the plant was dead, while a rating of 10 signifies approximately 100 percent plant growth in excess of a plant with a rating of 5 (control). The rating was based on the length of the stems, thickness of the stems, size of leaf structure, distances between the leaves, color, and similar characteristics of plants which are used in determining the health and vigor of the plants.

TABLE I

| Container No. | Amount of $C_2H_5OH$ added in grams | Rating |
| --- | --- | --- |
| 1 | 1.5 (1200 pounds/acre) | 8 |
| 2 | 0.37 (300 pounds/acre) | 7 |
| 3 | 0 | 5 |

The tomato plants in containers 1 and 2 were superior in size as compared to the plant in container 3. Not only were the plants in containers 1 and 2 significantly taller, but the stems of the plants were thicker, there were more of them, and the root systems of these plants were more highly developed as compared to the plant in container 3. That is they were thicker, longer, and there were more of them.

In a similar manner cucumbers and beans are planted, and rated with substantially the same results.

EXAMPLE 2

A second group of tests were accomplished concurrent with the tests as effected in Example 1 in order to determine the effect of the fertilizer.

A stock solution was prepared by dissolving two large teaspoons of Nutro® plant food crystals in one-half gallon of water. Portions of this solution, 100 milliliters, were applied to the same sterilized soil as used in Example 1, together with 50 milliliters of distilled water, and different amounts of 2B ethyl alcohol, as illustrated in Table II. Four containers were used, containers 4–7, container 7 being the control, each container containing about 1,500 grams of soil.

Young tomato plants three inches tall were then added to containers 4–7 in the greenhouse. The containers were observed about one month later and the plants contained therein were rated, the results being listed in Table II.

TABLE II

| Container No. | Amount of $C_2H_5OH$ added in grams | Rating |
| --- | --- | --- |
| 4 | 6 (4,800 pounds/acre) | 9 |
| 5 | 1.5 (1,200 pounds/acre) | 7 |
| 6 | 0.37 (300 pounds/acre) | 9 |
| 7 | 0 | 5 |

EXAMPLE 3

In soilless cultures (hydroponic systems), the use of varying amounts of 2B ethanol were tested for growth stimulation of plants. The tests were accomplished in 250 milliliter beakers covered with a rubber dome to prevent evaporation, avoid contamination and the like. Beakers 1, 2, 3 and 4 contained 200 milliliters of a fertilizer solution. Additionally, beakers 1, 2 and 3 contained amounts of ethanol, as reported in Tale III. Beaker 4 was the control beaker and contained no ethanol. The fertilizer solution was prepared by dissolving one-quarter of a teaspoon of Nutro plant food crystals per one-half gallon of distilled water.

Young tomato plants about three inches tall were placed in the beakers, 1–4, at the same time. Aeration of the solutions was then accomplished by bubbling air through them, and periodic additions of a small amount of ferrous sulfate, less than 0.5 gram, were equally made to each beaker. The plants were rated about a month later. The results are reported in Table III.

In a second series of tests, beakers 5–8 contained 200 milliliters of a fertilizer solution prepared by dissolving ⅜ of a teaspoon of Nutro food crystals per gallon of water, and amounts of ethyl alcohol as reported in Table III. Beaker 9 was a control beaker and contained no ethanol. Aeration of the solution, and addition of ferrous sulfate was accomplished as done above with beaker 1–4.

A group of young tomato plants were placed in these beakers and removed a month later. A second group of young tomato plants were placed in beakers 5–9 without changing the solution. The plants were rated about one month later. The results are tabulated in Table III.

TABLE III

| Beaker No. | Amount of 2B ethanol | Rating |
| --- | --- | --- |
| 1 | 0.2 percent | 8 |
| 2 | 0.1 percent | 8 |
| 3 | 0.05 percent | 6 |
| 4 | 0 control | 5 |
| 5 | 0.1 percent | 5 |
| 6 | 0.2 percent | 5 |
| 7 | 0.5 percent | 8 |
| 8 | 1.0 percent | 10 |
| 9 | 0 control | 5 |

Beakers 1–4, results based on first planting.
Beakers 5–9, results based on second planting.

In a similar manner cucumbers and beans are planted and rated with substantially the same results.

EXAMPLE 4

A solution comprised of 10 grams of ethyl alcohol per liter of water was prepared by dissolving the ethyl alcohol in water and various amounts of this solution were added to soil contained in a number of containers, as reported in Table IV. Each container contained about 200 milliliters of soil. The soil itself was comprised of approximately equal quantities by volume of sterilized sandy loam, peat moss and vermiculite. Water, 25 milliliters, was added to each of the containers in order to moisten the soil.

Groups of six containers containing the above materials were placed in plastic pans, 6 containers per pan. The containers in each of the pans were exposed to a light source, consisting of two double Gro-Lux® fluorescent lighting fixtures (40 watts each, 48 inches long), suspended 15 inches above the tops of the containers. The lights were timed to operate for 14 hours per day.

The contents of the six containers in each pan were treated with equal amounts of the ethyl alcohol solution, except for the control which was not treated with ethyl alcohol. Thus the contents of the containers in pan 1, containers a, b, c, d, e, and f were not treated with the ethyl alcohol solution and the contents of the six containers in pan 2, a, b, c, d, e, and f were treated with 1.25 milliliters of the ethyl alcohol solution. Similar treatments were effected to the contents of the containers in pans 3, 4, and 5 as illustrated in Table IV below.

One tomato and one cucumber plant were planted in each of the 4 containers in each pan, while 2 containers in each pan were allowed to remain fallow. About two weeks later, 25 milliliters of 0.4 percent fertilizer was added to each container. One day after the fertilizer addition, the plants were removed from 2 containers in each pan. These plants were replaced by new tomato and cucumber plants, designated c and d in Table IV.

In a similar manner cucumbers, beans, and radishes are planted and rated with substantially the same results.

B. Second planting, tomatoes only, same amounts of solution as used in Section A

| Pot Number | Roots | | | Tops | | |
|---|---|---|---|---|---|---|
| | Weight in grams | Rating [1] | Length in inches | Weight in grams | Rating [1] | Length in inches |
| 1c and 1d | 0.58 | 5 | 4 6.50 | 5.5 | 5 | 8 10.75 |
| 2c and 2d | 1.20 | 7 | 8 8.50 | 8.2 | 7 | 7 11.25 |
| 3c and 3d | 1.47 | 8 | 8 6 | 8.6 | 7 | 9.75 11.50 |
| 4c and 4d | 0.81 | 7 | 8.50 5.25 | 6.8 | 6 | 8.50 9.50 |
| 5c and 5d | 0.50 | 5 | 6 5.50 | 5.2 | 5 | 7 9 |

[1] Based on an average rating of 2 containers in each instance.

C. Fallow then planted—Same amounts of solution as used in Section A

| 1e and 1f | 1.03 | 5 | 5 7.50 | 9.4 | 5 | 9 12.5 |
|---|---|---|---|---|---|---|
| 2e and 2f | 1.84 | 6 | 9 12 | 14.3 | 7 | 11.5 15 |
| 3e and 3f | 1.28 | 5 | 6 7 | 14.9 | 6 | 13 13.5 |
| 4e and 4f | 1.42 | 6 | 6.50 7.50 | 13.2 | 6 | 11.5 14 |
| 5e and 5f | 1.13 | 5 | 6.50 5 | 12.9 | 6 | 12 12 |

In a similar manner cucumbers, beans, and radishes are planted, and rated with substantially the same results.

EXAMPLE 5

Field plots, 5 feet by 8 feet, were treated with an ethyl alcohol solution containing the amounts of ethyl alcohol as reported in Table V. These plots were seeded with tomatoes, corn, sugar beets, beans, cucumbers, cotton and several grasses. The plants were rated about four months later, the results being reported in Table V. This treatment was identified as pre-treatment. The soil was also treated after the plants had been growing about two weeks. This treatment was identified as post-treatment.

TABLE V

| Plot No. | Grams of ethanol | Grams of tomato fruit per plant | Weight of total tomato plant, grams | Grams of sugar beet root | Weight of total sugar beet plant, grams |
|---|---|---|---|---|---|
| 1 | 1 0 | 12 | 47 | 900 | 1,950 |
| 2 | 23 | 65 | 118 | 1,250 | 2,600 |
| 3 | 45.4 | 32 | 67 | 1,500 | 3,100 |
| 4 | 68 | 63 | 112 | 1,250 | 2,600 |
| 5 | 90 | 35 | 80 | 1,100 | 2,300 |
| 6 | 135 | 32 | 67 | 1,050 | 2,050 |
| 7 | 1 0 | 6 | 35 | 500 | 1,400 |
| 8 | 23 | 48 | 84 | 810 | 2,200 |
| 9 | 45.4 | 16 | 37 | 580 | 1,520 |
| 10 | 68 | 18 | 53 | 720 | 2,000 |
| 11 | 90 | 19 | 42 | 720 | 1,500 |
| 12 | 135 | 94 | 172 | 780 | 2,450 |

[1] Control.
Plots 1–6—pretreatment.
Plots 7–12—post-treatment.

At this time, the 2 containers that had been allowed to remain fallow were planted with one tomato and one cucumber plant per container, e and f in Table IV. About one month later, the plants were visually rated for growth characteristics, as accomplished in Example 1. The results are reported in Table IV.

TABLE IV

A. First planting after treatment

| Pot No. | Milliliters of solution added | Rating,[1] tomatoes | | Rating,[1] cucumbers | |
|---|---|---|---|---|---|
| | | Roots | Tops | Roots | Tops |
| 1a and 1b | 0 | 5 | 5 | 5 | 5 |
| 2a and 2b | 1.25 (75 lb./acre) | 8 | 5 | 7 | 6 |
| 3a and 3b | 2.5 (150) | 8 | 5 | 5 | 7 |
| 4a and 4b | 5 (300) | 8 | 5 | 7 | 9 |
| 5a and 5b | 10 (600) | 8 | 7 | 5 | 5 |

[1] Based on rating average of 2 containers in each instance.

In a similar manner cucumbers, beans, and radishes are planted, and rated with substantially the same results.

While there have been described various embodiments of the invention, the compositions and methods described are not intended to be understood as limiting the scope of the invention as it is realized that changes therewithin are possible, and it is further intended that each element recited in any of the following claims is intended to be understood as referring to all equivalent elements for accomplishing substantially the same results in substantially the same or equivalent manner, it being intended to cover the invention broadly in whatever form its principles may be utilized.

What is claimed is:

1. A method for increasing the amount of fruit produced from plants which comprises applying to a plant environment a fruit increasing amount of ethyl alcohol.

2. The method of claim 1 wherein about 50 to about 4800 pounds of ethyl alcohol per acre of soil is applied.

3. A method in accordance with claim 1 wherein the plant is tomatoes.

4. A method in accordance with claim 1 which comprises applying the ethyl alcohol in aqueous solution.

5. A method in accordance with claim 1 which comprises applying ethyl alcohol admixed with an aqueous fertilizer solution, wherein said fertilizer is comprised of 23% nitrogen, 17% phosphorus and 18% potash.

6. A method in accordance with claim 1 wherein the ethyl alcohol is applied at a rate of about 100 to about 300 pounds per acre.

7. A method in accordance with claim 1 wherein the ethyl alcohol used contains 0.5 gram of benzene per 100 gallons of 190 proof ethyl alcohol.

8. A method in accordance with claim 1 wherein the plant environment is soil and ethyl alcohol is applied thereto prior to planting.

9. A method in accordance with claim 1 where the plant environment is soil and ethyl alcohol is applied thereto subsequent to planting.

10. A method in accordance with claim 1 wherein the environment is soilless, and from about 0.01 weight percent to about 5 weight percent of ethyl alcohol is added to said environment.

11. A method in accordance with claim 1 wherein the plant is cucumbers.

12. A method in accordance with claim 1 wherein the plant is beets.

13. A method in accordance with claim 1 wherein the plant is radishes.

14. A method in accordance with claim 1 wherein the plant is legumes.

References Cited

UNITED STATES PATENTS

| 1,875,473 | 9/1932 | McKee | 71—77 |
| 2,321,736 | 6/1943 | Du Puis et al. | 71—77 |
| 3,264,083 | 8/1966 | Davies et al. | 71—106 |

FOREIGN PATENTS

| 721,208 | 1/1955 | Great Britain. |

OTHER REFERENCES

Miroshnichenko: Chemical Abstracts, vol. 42, col. 6486(e), 1948.

JAMES O. THOMAS, JR., Primary Examiner

UNITED STATES PATENT OFFICE
CERTIFICATE OF CORRECTION

Patent No. 3,472,647    Dated October 14, 1969

Inventor(s) George T. Miller

It is certified that error appears in the above-identified patent and that said Letters Patent are hereby corrected as shown below:

Column 3, line 24, delete "was" and insert -- were --;

Column 4, line 16, delete "Tale" and insert -- Table --;

Column 6, line 5, Example 4-Table B, 2c and 2d under Rating[1], sixth column, delete "7" and insert -- 6 --.

Signed and sealed this 11th day of August 1970.

(SEAL)
Attest:

EDWARD M. FLETCHER, JR.　　　　WILLIAM E. SCHUYLER, JR.
Attesting Officer　　　　　　　　Commissioner of Patents